United States Patent
Morales

(10) Patent No.: US 10,531,197 B1
(45) Date of Patent: Jan. 7, 2020

(54) WIRELESS HEADSETS FOR AUDIO BROADCASTS

(71) Applicant: David Morales, Montmorenci, SC (US)

(72) Inventor: David Morales, Montmorenci, SC (US)

( * ) Notice: Subject to any disclaimer, the term of this patent is extended or adjusted under 35 U.S.C. 154(b) by 0 days.

(21) Appl. No.: 16/137,942

(22) Filed: Sep. 21, 2018

(51) Int. Cl.
| | |
|---|---|
| H04R 5/02 | (2006.01) |
| H04R 1/10 | (2006.01) |
| H04R 5/033 | (2006.01) |
| H04R 5/04 | (2006.01) |
| H04R 3/00 | (2006.01) |
| G06F 17/28 | (2006.01) |

(52) U.S. Cl.
CPC .......... *H04R 5/033* (2013.01); *G06F 17/289* (2013.01); *H04R 1/1083* (2013.01); *H04R 3/00* (2013.01); *H04R 5/04* (2013.01); *H04R 2420/07* (2013.01); *H04R 2430/01* (2013.01); *H04R 2460/01* (2013.01)

(58) Field of Classification Search
CPC . H04R 5/033; H04R 5/04; H04R 3/00; H04R 2420/07; H04R 2430/01; H04R 2460/01
USPC ............ 381/311, 72, 74, 79, 394, 71.6, 384; 455/575.2
See application file for complete search history.

(56) References Cited

U.S. PATENT DOCUMENTS

| | | | |
|---|---|---|---|
| 5,794,127 A * | 8/1998 | Lansang | H04R 1/1041 340/12.5 |
| D430,140 S | 8/2000 | Roman | |
| 6,728,585 B2 | 4/2004 | Neoh | |
| 8,593,573 B2 | 11/2013 | Pricem et al. | |
| 9,106,986 B2 | 8/2015 | Shen et al. | |
| 9,438,963 B2 | 9/2016 | Kim et al. | |
| 2002/0003889 A1* | 1/2002 | Fischer | H04R 1/1041 381/370 |
| 2005/0238180 A1* | 10/2005 | Chen | G10K 11/178 381/71.6 |
| 2006/0271967 A1 | 11/2006 | So | |
| 2007/0291955 A1* | 12/2007 | Yamashita | H04R 5/00 381/79 |
| 2010/0185432 A1* | 7/2010 | Almagro | G06F 17/289 704/2 |
| 2012/0095749 A1 | 4/2012 | Capretta | |
| 2013/0303096 A1* | 11/2013 | Foster | H04R 1/1091 455/149 |
| 2015/0326973 A1* | 11/2015 | Marrin | G11B 20/10527 381/309 |
| 2016/0150311 A1* | 5/2016 | Bremyer | H04R 1/1008 381/371 |
| 2016/0198250 A1* | 7/2016 | Pan | H04R 1/1041 381/74 |
| 2016/0381451 A1* | 12/2016 | Pong | H04R 1/028 381/74 |
| 2018/0199128 A1* | 7/2018 | Chiu | H04R 1/1041 |

FOREIGN PATENT DOCUMENTS

GB 2252013 A 7/1992

* cited by examiner

*Primary Examiner* — Xu Mei

(57) ABSTRACT

A wireless audio headset is presented. The wireless audio headset has a wireless receiver for receiving wireless audio transmissions. The wireless audio headset also has a volume control panel for controlling the volume of the received audio transmission. The volume control panel may have other controls such as a recording control for recording received audio.

1 Claim, 2 Drawing Sheets

WIRELESS HEADSETS FOR AUDIO BROADCASTS

FIELD OF THE INVENTION

This invention relates to headsets. More particularly, it relates to wireless audio headsets.

BACKGROUND

People often attend audiovisual presentations for business and entertainment. Audiovisual presentations may be private or public, and are presented in an audiovisual room such as a movie theater, auditorium, or conference room, or in a large open space, such as a stadium, arena, pavilion, convention hall, outdoor space or open field.

In addition to displaying images of an image or video source (e.g., 35 mm film, in the case of a movie presentation in a theater), an audiovisual presentation involves amplifying and playing audio of the audiovisual presentation through speakers positioned at particular locations in the audiovisual presentation room or space. Unfortunately, there are a number of factors that can prevent or hinder an audiovisual presentation attendee's ability to hear the sound produced by the audiovisual presentation room or space speakers.

For example, the attendee may have a hearing impairment, may be hidden behind an obstruction that is blocking the sound, or may simply be too far away from the speakers. Various other factors can prevent or interfere with the ability of an attendee to listen to the audio of the audiovisual presentation. For example, in an audiovisual presentation involving the presentation of a movie, an attendee may have difficulty listening to the movie audio due to impolite and talking attendees. Or, in a forum in which attendees are not expected to be quiet and there is a large number of attendees, such as a stadium, arena, pavilion or convention hall, talking attendees and other cacophony can interfere with an attendee's ability to listen to and enjoy the audio of the audiovisual presentation.

In addition to the foregoing problems, the sound produced by audiovisual presentation systems speaker systems is often of poor quality. Poor quality sound not only hinders the audiovisual presentation attendees' ability to hear and comprehend the audio of the audiovisual presentation, it also diminishes the attendees' listening experience and enjoyment of the audiovisual presentation.

DETAILED DESCRIPTION

Reference will now be made in detail to the present preferred embodiments, examples of which are illustrated in the accompanying drawings. All terms in the plural shall also be taken as singular and vice-versa. Further, any reference to he shall also be applicable to she and vice-versa.

Figure 1:
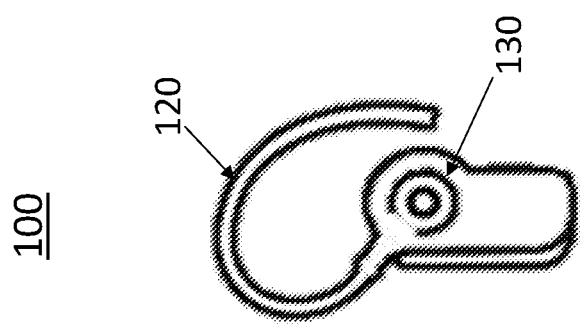
FIG. 1 is a view of an exemplary headset.

Referring to FIG. 1, a wireless headset 100 is shown. The wireless headset 100 is useful in receiving audio signals and allowing a person to remotely hear a movie in a theater, a television, etc. Further, the wireless headset 100 allows the user to move further away from the source of the audio and still hear the audio so as not to miss any part of the movie, television show, etc.

The wireless headset 100 may also include noise cancelling technology to allow for a clearer audio for the user when the user is in a crowded area or external noises are of such a volume to impede hearing the audio clearly. The wireless headset 100 may receive and convert the audio signal being received via Bluetooth (IEEE 802.15), WiFi (IEEE 802.11), 4G cellular, 5G cellular, etc.

The wireless headset 100 has a speaker 110. The speaker 110 of the wireless headset 100 externalizes the audio so that a person can hear the audio. The speaker 110 can be any type of speaker that can be useful in a headset.

The wireless headset 100 further has a coupling 120 that fits around the ear or head of the user. This allows for the wireless headset 100 to be securely fitted onto the user to avoid losing the wireless headset 100 or having the wireless headset 100 move in such a way as to cause the user to not properly hear the audio or to become uncomfortable. The coupling 120 may be a wire, a curved semi-hard plastic, elastic, etc.

Figure 2:
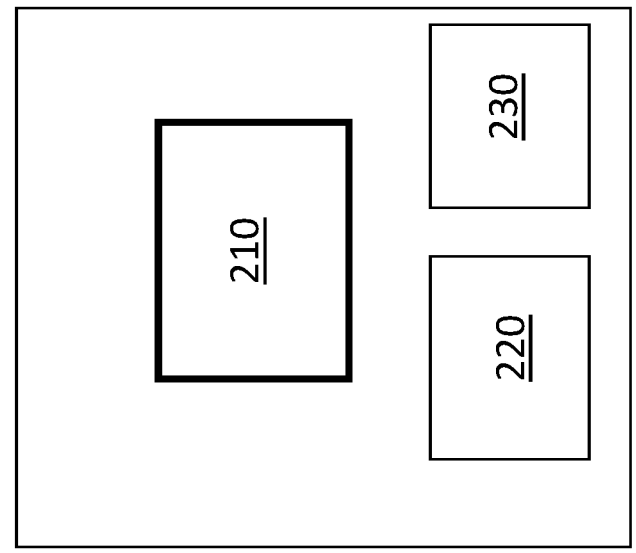
FIG. 2 is a perspective of the internal aspects of the headset of FIG. 1.

Moving now to FIG. 2, the wireless headset 100 of FIG. 1 has an electronic control board 200. The electronic control board 200 is the intelligence of the wireless headset 100. The electronic control board 200 is secured inside of the wireless headset 100 to protect the electronic components from dirt, damage, etc.

The electronic control board 200 has a receiver 210. The receiver 210 receives a wireless signal from an external source. The wireless signal received by the receiver 210 The wireless headset 100 may receive and convert the audio signal being received via Bluetooth (IEEE 802.15), WiFi (IEEE 802.11), 4G cellular, 5G cellular, etc.

The electronic control board 200 of the wireless headset 100 further has a controller 220. The controller 220 is communicatively coupled to the receiver 210. The controller 220 provides the conversion of the received wireless signal into audio. The controller 220 receives the received signal from the receiver 210. The controller 220 then translates the received signal into an audio pattern.

If the controller 220 is so equipped and the technology is turned on, the audio pattern may then be converted to another language, volume of the audio may be increased or decreased, etc. The controller 220 may also have noise cancelling technology. The noise cancelling technology tests environmental noise by sampling the noise and determining the level of the noise. If a threshold is reached, the noise cancelling technology provides white noise into the audio stream to remove the external noise.

The electronic control board 200 may also have a memory. The memory 230 is communicatively coupled to the controller 220. The memory 230 may receive audio from the controller 220 when the controller 220 has been programmed to store audio received from the receiver 210. The memory 230 may be any type of memory and may be of a size that can store a range of several minutes to at least an hour of audio.

Figure 3:
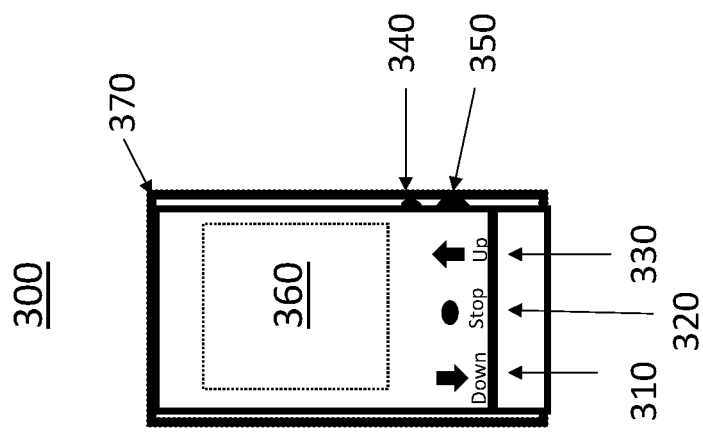
FIG. 3 is a view of an exemplary control panel.

Moving now to FIG. 3, a control panel 300 is presented. The control panel 300 is communicatively coupled to the wireless headset 100 and to the electronic control board 200. The control panel 300 may be a touch screen, toggle switch, or a combination of several technologies, etc. The control panel 300 may have a volume up control 310, a volume down control 320, a pause or stop control 330. Further the control panel 300 may have a pressure sensor 330 and a sliding pressure setting 340.

The volume up control 310 when actuated may send a signal to the controller 220 of the electronic control board 200 to increase the volume of the audio being received by a user through the speaker 110 of the wireless headset 100. The volume up control 310 may be a touch button, a toggle switch, etc.

The volume down control 320 when actuated may send a signal to the controller 220 of the electronic control board 200 to decrease the volume of the audio being received by a user through the speaker 110 of the wireless headset 100. The volume down control 320 may be a touch button, a toggle switch, etc.

The pause or stop control 330 when actuated may send a signal to the controller 220 to pause or stop the audio being sent to the speaker 110 of the wireless headset. In some cases, a second actuation of the pause or stop control 330 sends a signal to the controller 220 which is interpreted to un-pause the audio being sent to the speaker 110 or may indicate that no further audio is to be sent to the speaker 110 of the wireless headset 100. The pause or stop control 330 may be a touch button, a toggle switch, etc.

The pressure sensor 340 of the control panel 300 may be available to allow the user to only use the volume up control 310, volume down control 320, and the pause or stop control 330 when the user is actuating the pressure sensor 340 simultaneously. Thus, when walking or moving an accidental actuation of one of the controls 310, 320, 330, will be perceived as a false indicator and will not cause the controller 220 to act. The pressure sensor 340 may be a touch button or any type of sensor to detect pressure being exerted.

When the control panel 300 is equipped with a sliding pressure setting 350, the user may increase or decrease the pressure exerted on any of the controls 310, 320, 330 to actuate the desired control. Thus, the user may desire to increase the pressure necessary to actuate the volume up control 330 by increasing the pressure control setting 350. The pressure control setting 350 may be a touch button, a toggle switch, etc.

The control panel 300 may also have a display screen 360. The display screen 360 may be useful to show volume level, audio source, pressure level, etc. The display screen of the control panel 300 may be LED, LCD, touchscreen, etc.

The control panel 300 may also have a cover 370. The cover 370 is a protective cover for the controls 310, 320, 330, the pressure sensor 340, the pressure control setting 350 and the display panel 360. The cover 370 slidably engages with the control panel 300. The cover 370 slides up to reveal and allow access the various controls 310, 320, 330 and slides to a closed position to protect the controls 310, 320, 330 from being accidently actuated and to protect the controls 310, 320, 330, the pressure sensor 340, the pressure control setting 350 and the display panel 360 from the elements. The cover 170 may be translucent, tinted of any color, etc. Further, the cover 370 is preferably a slide cover but may be a snap on or full enclosing cover. The cover 370 may be made from plastic, glass, etc.

Figure 4:
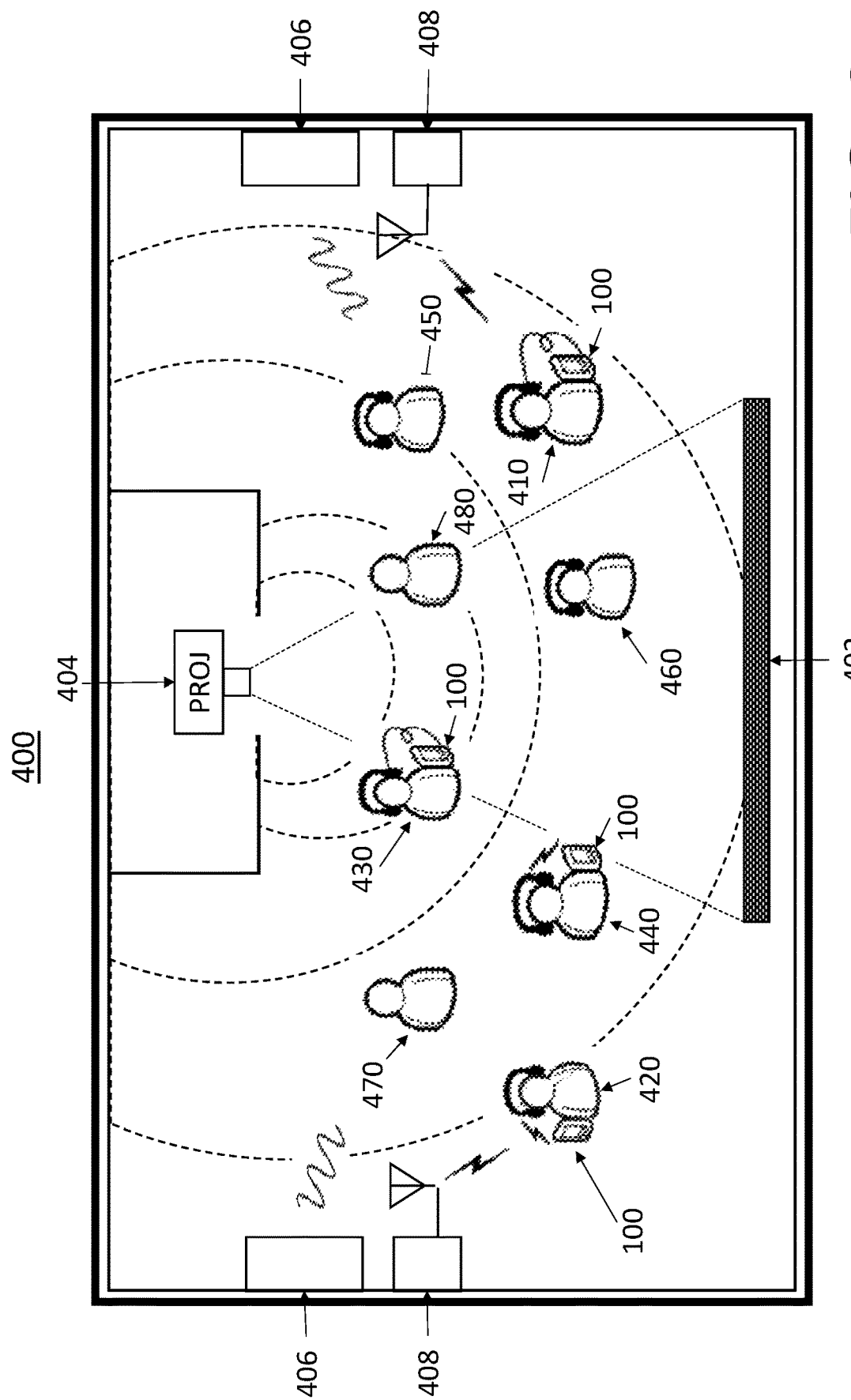
FIG. 4 is an exemplary example of the use of the exemplary headset.

FIG. 4 shows the exemplary wireless headset 100 of FIG. 1 in a theater 400. A movie is being shown on the screen 402 in the theater 400. The movie is projected by a projector 404. Audio of the movie is sent from the projector 404 to the speakers 406 and to the wireless transmitters 408. The speakers 404 sent the audio into the theater 400 in the traditional manner and anyone in the theater 400 is able to hear the audio of the movie.

Some of the patrons 410, 420, 430, 440, of the theater 400 have the ability to hear the audio over the wireless headsets 100 that they have be pre-equipped with. The non-headset patrons 450, 460, 470, 480 are not outfitted with wireless headsets 100 and thus are able to only hear the audio through the speakers 404.

After the movie begins, patron 410 has trouble hearing the audio and actuates the volume up control 310. The volume of the audio increases through the speaker 110 of the wireless headset 100 and no one else is affected by the increase in volume.

Patron 420 elects to get up and get popcorn. Patron 420 leaves the theater 400 and proceeds to the refreshment counter. The patron 420 is still able to hear the audio associated with the movie being shown in the theater 400, thus when the patron 420 returns to his/her seat the patron 420 has not missed any audio from the movie shown in the theater 400.

The features described with respect to one embodiment may be applied to other embodiments or combined with or interchanged with the features of other embodiments, as appropriate, without departing from the scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A wireless audio headset, the wireless audio headset consisting of:
a wireless receiver, for receiving a wireless audio transmission, wherein the wireless audio transmission being one of: 4G cellular and 5G cellular;
a volume control panel, the volume control panel for controlling a volume of the audio headset;
the wireless receiver receiving the wireless audio transmission and relays the audio wireless transmission to the audio headset for a user to hear the wireless audio transmission;
a recording unit, the recording unit for recording audio received wirelessly;
wherein the volume control panel having a cover;
wherein the cover of the volume control panel is translucent; wherein the cover is slidably coupled to the volume control panel; wherein the audio headset is noise cancelling;
wherein the received wireless audio transmission being transmitted from a television;
wherein the received wireless audio is from up to 400 feet;
wherein the audio headset has a logo, the logo being attached to the audio headset;
wherein the volume control panel has a plurality of controls; wherein one of the plurality of controls increases the volume; wherein the audio headset has a language translator;
wherein the language translator translates the audio to a different language than the audio is transmitted; and
wherein the audio headset being plastic.

* * * * *